United States Patent
Bagepalli et al.

(10) Patent No.: US 10,733,555 B1
(45) Date of Patent: Aug. 4, 2020

(54) WORKFLOW COORDINATOR

(71) Applicant: Walmart Apollo, LLC, Bentonville, AR (US)

(72) Inventors: Vaidehi Bagepalli, Bentonville, AR (US); Phanish Lakkarasu, Hayward, CA (US); Hari Harasudan Ramasubbu, Frisco, TX (US)

(73) Assignee: WALMART APOLLO, LLC, Bentonville, AR (US)

( * ) Notice: Subject to any disclaimer, the term of this patent is extended or adjusted under 35 U.S.C. 154(b) by 614 days.

(21) Appl. No.: 14/214,295

(22) Filed: Mar. 14, 2014

(51) Int. Cl.
G06Q 10/06 (2012.01)

(52) U.S. Cl.
CPC ................ *G06Q 10/0633* (2013.01)

(58) Field of Classification Search
None
See application file for complete search history.

(56) References Cited

U.S. PATENT DOCUMENTS

| | | |
|---|---|---|
| 5,778,370 A | 7/1998 | Emerson |
| 5,794,236 A | 8/1998 | Mehrle |
| 6,029,139 A | 2/2000 | Cunningham |
| 6,073,108 A | 6/2000 | Peterson |
| 6,249,779 B1 | 6/2001 | Hitt |
| 6,424,949 B1 | 7/2002 | Deaton et al. |
| 6,510,420 B1 | 1/2003 | Cessna et al. |
| 6,700,575 B1 | 3/2004 | Bovarnick et al. |
| 6,704,320 B1 | 3/2004 | Narvaez et al. |
| 6,738,736 B1 | 5/2004 | Bond |
| 6,826,576 B2 | 11/2004 | Lulich |
| 6,925,441 B1 | 8/2005 | Jones, III et al. |
| 7,028,894 B2 | 4/2006 | Turner et al. |
| 7,039,856 B2 | 5/2006 | Peairs |
| 7,346,538 B2 | 3/2008 | Reardon |
| 7,383,320 B1 | 6/2008 | Silberstein et al. |
| 7,529,756 B1 | 5/2009 | Haschart |
| 7,570,594 B2 | 8/2009 | Zhu et al. |
| 7,593,955 B2 | 9/2009 | Legault et al. |
| 7,693,917 B2 | 4/2010 | Chariot |
| 8,131,533 B2 | 3/2012 | Legault et al. |
| 8,200,477 B2 | 6/2012 | Yi |

(Continued)

FOREIGN PATENT DOCUMENTS

| | | |
|---|---|---|
| CN | 102737114 A | 10/2012 |
| CN | 102880503 A | 1/2013 |

(Continued)

OTHER PUBLICATIONS

Work teams, knowledge production and learning: A critical analysis of quality improvement processes (Year: 2000).*

(Continued)

*Primary Examiner* — Patricia H Munson
*Assistant Examiner* — Nancy Prasad
(74) *Attorney, Agent, or Firm* — Patterson Thuente Pedersen, P.A.

(57) ABSTRACT

The present disclosure extends to methods, systems, and computer program products for approving proposed business plans and automatically generating and coordinating workflow for establishing data tables for aggregating customer profiles data. The disclosure also extends to methods, systems and computer products for scheduling processes within workflows and checking the status of the workflows.

16 Claims, 6 Drawing Sheets

(56) References Cited

U.S. PATENT DOCUMENTS

| | | | |
|---|---|---|---|
| 8,200,528 B2 | 6/2012 | Chien | |
| 8,255,791 B2 | 8/2012 | Koren | |
| 8,260,670 B2 | 9/2012 | Walker et al. | |
| 8,260,840 B1 | 9/2012 | Sirota et al. | |
| 8,312,056 B1 | 11/2012 | Peng et al. | |
| 8,321,454 B2 | 11/2012 | Berlyant et al. | |
| 8,407,078 B1 | 3/2013 | Caputo | |
| 8,407,664 B2 | 3/2013 | Moosmann | |
| 8,412,549 B2 | 4/2013 | Graeber | |
| 8,473,329 B1 | 6/2013 | Manzi | |
| 8,489,532 B2 | 7/2013 | Hunt et al. | |
| 8,571,916 B1 | 10/2013 | Bruce | |
| 8,874,621 B1 | 10/2014 | Goodwin et al. | |
| 8,880,960 B1 | 11/2014 | Bergquist et al. | |
| 2002/0087388 A1 | 7/2002 | Keil et al. | |
| 2002/0143783 A1 | 10/2002 | Bakalash et al. | |
| 2002/0165701 A1 | 11/2002 | Lichtenberg et al. | |
| 2003/0009392 A1 | 1/2003 | Perkowski | |
| 2003/0046125 A1 | 3/2003 | Flores | |
| 2003/0083912 A1 | 5/2003 | Covington | |
| 2003/0229854 A1 | 12/2003 | Lemay | |
| 2004/0019535 A1 | 1/2004 | Perkowski | |
| 2004/0044753 A1 | 3/2004 | Toyoshima et al. | |
| 2004/0093244 A1 | 5/2004 | Hatcher et al. | |
| 2004/0118908 A1 | 6/2004 | Ando et al. | |
| 2004/0153378 A1 | 8/2004 | Perkowski | |
| 2004/0210479 A1 | 10/2004 | Perkowski et al. | |
| 2005/0004838 A1 | 1/2005 | Perkowski et al. | |
| 2005/0027443 A1 | 2/2005 | Cato | |
| 2005/0080609 A1 | 4/2005 | Bhaskaran | |
| 2005/0091276 A1 | 4/2005 | Brunswig | |
| 2005/0251456 A1 | 11/2005 | Perkowski | |
| 2006/0004746 A1 | 1/2006 | Angus et al. | |
| 2006/0011716 A1 | 1/2006 | Perkowski | |
| 2006/0080338 A1 | 4/2006 | Seubert et al. | |
| 2006/0085450 A1 | 4/2006 | Seubert et al. | |
| 2006/0111953 A1* | 5/2006 | Setya | G06Q 10/06 705/7.26 |
| 2006/0178918 A1 | 8/2006 | Mikurak | |
| 2006/0206894 A1* | 9/2006 | Jung | G06F 9/4887 718/100 |
| 2006/0212361 A1 | 9/2006 | Perkowski | |
| 2006/0235811 A1 | 10/2006 | Fairweather | |
| 2007/0033098 A1 | 2/2007 | Peters | |
| 2007/0047455 A1 | 3/2007 | Maeda | |
| 2007/0055560 A1 | 3/2007 | Quinn | |
| 2007/0061190 A1 | 3/2007 | Wardell | |
| 2007/0094067 A1 | 4/2007 | Kumar et al. | |
| 2007/0150387 A1 | 6/2007 | Seubert et al. | |
| 2007/0185721 A1 | 8/2007 | Agassi | |
| 2007/0192111 A1 | 8/2007 | Chasen | |
| 2007/0203778 A1 | 8/2007 | Lowson | |
| 2008/0140696 A1 | 6/2008 | Mathuria | |
| 2008/0162382 A1 | 7/2008 | Clayton et al. | |
| 2008/0167917 A1 | 7/2008 | Clayton et al. | |
| 2008/0177593 A1 | 7/2008 | Clayton | |
| 2008/0189240 A1 | 8/2008 | Mullins et al. | |
| 2008/0189296 A1* | 8/2008 | Cloutier | G06Q 10/06 |
| 2008/0243831 A1 | 10/2008 | Kunitake | |
| 2008/0255891 A1 | 10/2008 | Stone | |
| 2008/0270398 A1 | 10/2008 | Landau et al. | |
| 2008/0288320 A1 | 11/2008 | Ockers | |
| 2009/0018919 A1 | 1/2009 | Walker et al. | |
| 2009/0018996 A1 | 1/2009 | Hunt et al. | |
| 2009/0083119 A1 | 3/2009 | Mided et al. | |
| 2009/0083287 A1 | 3/2009 | Bell et al. | |
| 2009/0112678 A1* | 4/2009 | Luzardo | G06N 5/02 705/7.38 |
| 2009/0132347 A1 | 5/2009 | Anderson et al. | |
| 2009/0216576 A1 | 8/2009 | Saeed et al. | |
| 2009/0276771 A1 | 11/2009 | Nickolov | |
| 2009/0287526 A1 | 11/2009 | Ramkumar | |
| 2009/0287737 A1 | 11/2009 | Hammerly | |
| 2009/0292463 A1 | 11/2009 | Chase | |
| 2009/0319546 A1 | 12/2009 | Shaik | |
| 2010/0077316 A1 | 3/2010 | Omansky et al. | |
| 2010/0082691 A1 | 4/2010 | Jaster et al. | |
| 2010/0122232 A1 | 5/2010 | Reed et al. | |
| 2010/0131251 A1 | 5/2010 | Suzuki | |
| 2010/0138281 A1 | 6/2010 | Zhang et al. | |
| 2010/0150028 A1 | 6/2010 | Campbell et al. | |
| 2010/0235296 A1 | 9/2010 | Nakazato | |
| 2011/0158232 A1 | 6/2011 | Nesbitt et al. | |
| 2011/0191361 A1 | 8/2011 | Gupta et al. | |
| 2011/0208691 A1 | 8/2011 | Liu | |
| 2011/0246816 A1 | 10/2011 | Hsieh | |
| 2011/0282704 A1 | 11/2011 | Graeber et al. | |
| 2012/0054182 A1 | 3/2012 | Gupta et al. | |
| 2012/0254153 A1 | 10/2012 | Abraham et al. | |
| 2012/0265622 A1 | 10/2012 | Ramchandani | |
| 2012/0271860 A1 | 10/2012 | Graham, Jr. et al. | |
| 2012/0278165 A1 | 11/2012 | Mercuri et al. | |
| 2012/0278261 A1 | 11/2012 | Lin et al. | |
| 2012/0278323 A1 | 11/2012 | Chattopadhyay et al. | |
| 2012/0284036 A1 | 11/2012 | Evans | |
| 2012/0284727 A1 | 11/2012 | Kodialam et al. | |
| 2012/0310916 A1 | 12/2012 | Abadi et al. | |
| 2012/0311581 A1 | 12/2012 | Balmin et al. | |
| 2012/0323663 A1 | 12/2012 | Leach | |
| 2013/0013552 A1 | 1/2013 | Eshleman et al. | |
| 2013/0024418 A1 | 1/2013 | Sitrick et al. | |
| 2013/0036115 A1 | 2/2013 | Schwartz | |
| 2013/0036149 A1 | 2/2013 | Kosuru et al. | |
| 2013/0066551 A1 | 3/2013 | Bednar et al. | |
| 2013/0073340 A1 | 3/2013 | Alex et al. | |
| 2013/0167048 A1 | 6/2013 | Viol | |
| 2013/0205028 A1 | 8/2013 | Crockett | |
| 2013/0212474 A1 | 8/2013 | McCahon | |
| 2014/0053070 A1 | 2/2014 | Powers et al. | |
| 2014/0074762 A1 | 3/2014 | Campbell | |
| 2014/0074851 A1 | 3/2014 | Zhang | |
| 2014/0095447 A1 | 4/2014 | Deshmukh et al. | |
| 2014/0122205 A1 | 5/2014 | Sohya et al. | |
| 2014/0172560 A1 | 6/2014 | Satyavolu et al. | |
| 2014/0188804 A1 | 7/2014 | Gokhale et al. | |
| 2014/0207592 A1 | 7/2014 | Kavis et al. | |
| 2014/0365314 A1 | 12/2014 | Torrens et al. | |
| 2015/0006279 A1 | 1/2015 | Khann et al. | |
| 2015/0006712 A1 | 1/2015 | Khann et al. | |
| 2015/0088915 A1 | 3/2015 | Votaw et al. | |
| 2015/0120368 A1 | 4/2015 | Agrawal et al. | |
| 2015/0120745 A1 | 4/2015 | James | |
| 2015/0169624 A1 | 6/2015 | Guptz | |
| 2015/0170175 A1 | 6/2015 | Zhang et al. | |
| 2015/0220951 A1 | 8/2015 | Kurapati et al. | |
| 2015/0244804 A1 | 8/2015 | Warfield et al. | |
| 2015/0278298 A1 | 10/2015 | Boldyrev | |

FOREIGN PATENT DOCUMENTS

| | | | | |
|---|---|---|---|---|
| CN | 103473342 A | | 12/2013 | |
| EP | 1486929 A2 | | 12/2004 | |
| EP | 1653324 A2 | | 5/2006 | |
| WO | WO2001014992 A1 | | 3/2001 | |
| WO | WO2002013101 A1 | | 2/2002 | |
| WO | WO-2007135820 A1 * | | 11/2007 | G06Q 10/06 |
| WO | WO2009041962 A1 | | 4/2009 | |
| WO | WO2009105100 A1 | | 8/2009 | |
| WO | WO2014043338 A1 | | 3/2014 | |

OTHER PUBLICATIONS

Pavlou, Pavlos A. University of Southern California, ProQuest Dissertations Publishing, 2004. 3140534. (Year: 2004).*

Application and File History for U.S. Appl. No. 14/212,704, filed Mar. 14, 2014, Inventor: Jeon.

Application and File History for U.S. Appl. No. 14/214,262, filed Mar. 14, 2014, Inventors: Bagepalli et al.

Application and File History for U.S. Appl. No. 14/214,233, filed Mar. 14, 2014, Inventors: Marimuthu et al.

Application and File History for U.S. Appl. No. 14/212,441, filed Mar. 14, 2014, Inventors: Bailey et al.

(56) References Cited

OTHER PUBLICATIONS

Application and File History for U.S. Appl. No. 14/214,329, filed Mar. 14, 2014, Inventors: Pothireddy et al.
Application and File History for U.S. Appl. No. 14/214,170, filed Mar. 14, 2014, Inventors: Bailey et al.
Sherman (Creating Efficient SQL—The De-Normalize Transpose, *Wayback Machine*, Jan. 26, 2009, 14 pages.
DigDB, DigDB, Add-in Tools for Excel Elites, *Wayback Machine*, Aug. 7, 2007, 2 pages.
Lopon, Llama, *Using Rollup to Aggregate Data in SQL*, Jan. 17, 2004, Ode to Code, 2 pages.
Cho et al., "Dynamic core affinity for high-performance file upload on Hadoop Distributed File System", Parallel Computing 40 (2014) 722-737. (Year: 2014).
Jurik et al., "Bridging the gap between real world repositories and scalable preservation environments" Int J Digit Libr (2015) 16: 267-282. (Year: 2015).
Li et al., "Enabling dynamic file I/O path selection at runtime for parallel file system", J Supercomput (2014) 68:996-1021. (Year: 2013).
Bhupathiraju et al., "The Dawn of Big Data—Hbase", 2014 Conference on IT in Business, Industry and Government (CSIBIG). Proceedings: 1-4;474. IEEE. (2014) (Year: 2014).

\* cited by examiner

WORKFLOW COORDINATOR

BACKGROUND

With the increased popularity and consumer trust of online transactions, more and more consumers are doing business over the internet from their computers. As a result of any transaction over the internet, information is created in the form of data that characterizes the transaction, the transaction participants, and many of the circumstances and conditions surrounding the transaction. It has become customary to record and study this transaction data for the benefit of future business decisions and future internet offerings in general. However, with the increasing number of internet users worldwide the data generated by these network interactions is massive and voluminous. This data must be organized in order for it to be useful to businesses and consumers alike. Advances in database creation and management have provided opportunities for data aggregation and more timely use of accumulated data.

Typically, a database user will decide the attributes that they believe are useful for a given study. The database user will form a table of user attributes, transaction attributes, and product attributes that they believe are relevant to the study. They will then begin to collect values for storage within the table. Often times the data that is available is already in a table that has been collected prior to the conception of the study. Large entities or businesses maintain databases. Over time these databases become very large. Such entities and businesses may have maintained such databases for many years and the data contained therein can be studied after the fact at a later date.

What is needed are methods, systems, and computer program products for generating attribute tables for holding attributes while a corresponding business plan is in an approval process; and methods, systems and computer program products for approving proposed business plans and automatically generating workflows for establishing data tables for aggregating customer profile data in those data tables; and methods, systems and computer programs for checking the status of the workflows. As will be seen, the disclosure provides such methods, systems and computer programs for generating attribute tables for holding attributes while a corresponding business plan is in an approval process, for approving proposed business plans and automatically generating workflows for establishing data tables for aggregating customer profile data in those data tables, and checking the status of the workflows in an effective and elegant manner.

BRIEF DESCRIPTION OF THE DRAWINGS

Non-limiting and non-exhaustive implementations of the present disclosure are described with reference to the following figures, wherein like reference numerals refer to like parts throughout the various views unless otherwise specified. Advantages of the present disclosure will become better understood with regard to the following description and accompanying drawings where.

DETAILED DESCRIPTION

Figure 1:
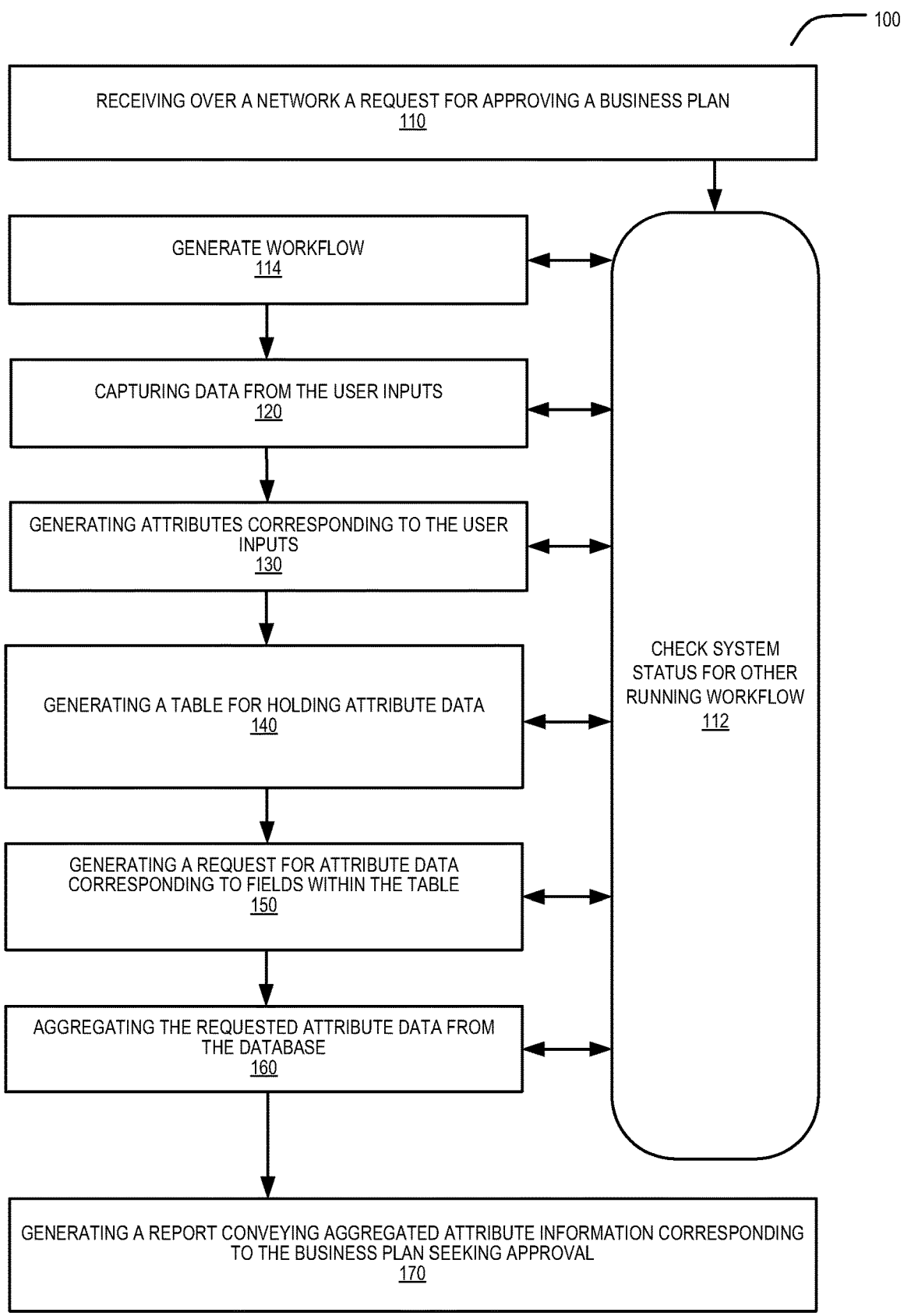
FIG. 1 illustrates an implementation of a system and method for generating attribute tables for holding attributes while a corresponding business plan is in an approval process with a workflow check in accordance with the teachings and principles of the disclosure.

The present disclosure extends to methods, systems, and computer program products for automatically generating workflow for establishing data tables for aggregating customer profiles data over a computer network. The disclosure also extends to methods, systems, and computer program products for generating workflows and checking the status of the workflows over a computer network. In the following description of the present disclosure, reference is made to the accompanying drawings, which form a part hereof, and in which is shown by way of illustration specific implementations in which the disclosure may be practiced. It is to be understood that other implementations may be utilized and structural changes may be made without departing from the scope of the present disclosure.

Implementations of the present disclosure may comprise or utilize a special purpose or general-purpose computer, including computer hardware, such as, for example, one or more processors and system memory as discussed in greater detail below Implementations within the scope of the present disclosure also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice-versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. RAM can also include solid state drives (SSDs or PCIx based real time memory tiered storage, such as FusionIO). Thus, it should be understood that computer storage media (devices) can be included in computer system components that also (or even primarily) utilize transmission media.

Computer-executable instructions comprise, for example, instructions and data, which, when executed at a processor, cause a general purpose computer, special purpose computer, or special purpose processing device to perform a certain function or group of functions. The computer executable instructions may be, for example, binaries, intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, commodity hardware, commodity computers, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the disclosure can also be used in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, or any suitable characteristic now known to those of ordinary skill in the field, or later discovered), service models (e.g., Software as a Service (SaaS), Platform as a Service (PaaS), Infrastructure as a Service (IaaS)), and deployment models (e.g., private cloud, community cloud, public cloud, hybrid cloud, or any suitable service type model now known to those of ordinary skill in the field, or later discovered). Databases and servers described with respect to the present disclosure can be included in a cloud model.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the following description and Claims to refer to particular system components. As one skilled in the art will appreciate, components may be referred to by different names. This document does not intend to distinguish between components that differ in name, but not function.

As used herein, the phrase "attribute" is intended to denote characteristics and behaviors of things, users, items, products and objects that can be digitally quantified into values that can be studied and compared.

As used herein, the phrase "attribution" is intended to mean the process by which things are given attributes, or whereby things are organized by their attributes.

As used herein, the phrase "business plan" is intended to denote any proposed plan that will use the features of the invention in order to be approved. For example, a business plan may be a plan to develop a cracker for sale, and the plan may be approved based on the attributes of success that may be discovered for the cracker.

As used herein, databases may comprise table data structures therein in order to organize attribute data in a useable way.

The disclosure relates to systems and methods of creating new attributes through an internal business approval process of a company or through third party business plan submittal to, and approval by, a company or individual. The systems and methods disclosed herein may utilize a computer assisted retrieval ("CAR") engine that will initiate a workflow that will generate the attributes. The systems and methods of the disclosure will create the joins and rollups in the background automatically or in real-time based on basic customer data and basic customer input parameters. The systems and methods of the disclosure provide an elegant solution that creates the process and the storage of the attribute information by creating the database tables, which will hold the newly created attributions as created by the customer.

The systems and methods of the disclosure automate the processing and storage of attribute information by creating the database tables, which will hold the new attributions as created by the customer. Attributions may include demographic, geographic, and any other attributions that may be created by the customer. As new attributions are created for a customer, the systems and methods of the disclosure use those attributions and build the necessary tables to aggregate totals without manual intervention. The systems and methods of the disclosure may operate to reduce development time and allow business partners to interact with the overall system. Thus, the systems and methods allows business to create a new customer attribution or attributions. The systems and methods of the disclosure capture the user input and automatically create tables to store the data once aggregated. The automatically created tables may be done in real-time or near real-time. Users are then able to take the calculations from the new attributions to make business decisions.

The systems and methods of the disclosure contemplate creating new, flexible database technology in order to make rapid aggregated data studies to assist in making business decisions. With current technology, while one process is running another may be executed causing the first or parent process to fail. The disclosure utilizes a check system and method, such that the coordinator for the workflow can see if the process is running before a second process is executed, such that there is no overlap to cause a process failure.

Referring now to FIG. 1, an implementation of a system and method 100 for automatically generating workflow for establishing data tables for aggregating customer profiles data over a computer network is illustrated. The figure also illustrates a system and method 100 for generating workflows and checking the status of the workflows and the processes of the workflow over a computer network. The system and method 100 may comprise receiving a request over a network for approval of a business plan at 110. The system and method 100 may further comprise checking the system status to determine if a previous workflow is being executed at 112. At 114, a new workflow may be initiated or generated. It will be appreciated that the generated workflow may comprise any combination of the features or all of the features disclosed in boxes 120-170 without departing from the scope of the disclosure, including capturing from the business plan user inputs that describe features of the business plan; generating attributes corresponding to the user inputs that will be used in the business plan and storing them in memory; generating a table for storing attribute data therein that corresponds to the generated attributes for use by the business plan; generating a request for attribute data corresponding to fields within the table of attributes for requesting the attribute data from a source database; aggregating the requested attribute data from the source database; populating the fields within the table with the aggregated attribute data; and generating a report conveying aggregated attribute information corresponding to the business plan seeking approval and the user inputs.

The system and method 100 may further comprise capturing user inputs from the business plan or based on the business plan at 120. The user inputs may describe features or attributes contained within or that are part of the business plan.

The system and method of FIG. 1 may further comprise generating attributes corresponding to the user inputs that will be used in the business plan at 130. At 140, a table may be generated for storing attribute data therein. Generation of the table may include, metadata, headers, footers, relative maximums, relative minimums and the like. The attribute data may correspond to the generated attributes for use by the business plan.

At 150, a request may be generated for attribute data corresponding to fields within the table of attributes for requesting the attribute data from a database repository. The system and method may further comprise aggregating the requested attribute data from the database at 160. Thereafter, the system and method may populate the fields within the table with the aggregated attribute data and update the metadata. At 170, a report may be generated, wherein the report may convey aggregated attribute information corresponding to the user inputs and the business plan for which approval is sought.

Continuing to refer to FIG. 1, the system and method 100 may further comprise generating a hierarchy of attributes such that different attributes may be analyzed with different strengths within the table. The system and method 100 may further comprise providing a hierarchy of a plurality of database sources for use in attribute data conflict resolution.

It will be appreciated that a file distributed system may be implemented by the disclosure. For example, the Hadoop distributed file system (HDFS) may be used by the disclosure. The HDFS is a distributed, scalable, and portable file-system. It is largely written in Java and is used within the Hadoop framework. Each node in a Hadoop instance typically has a single namenode, which may be a cluster of datanodes that form a HDFS cluster. Each node may not require a datanode to be present. Each datanode may serve up blocks of data over the network using a block protocol specific to HDFS. The file system may use the TCP/IP layer for communication. Clients use a remote procedure call (RPC) to communicate between one another.

It will be appreciated that HDFS stores large files (typically in the range of gigabytes to terabytes) across multiple computers or machines. It achieves reliability by replicating the data across multiple hosts. As such, it theoretically does not require RAID storage on hosts. However, it will be appreciated that to increase I/O performance some RAID configurations may still be useful. With the default replication value, 3, data is stored on three nodes: two on the same rack, and one on a different rack. Data nodes may talk to each other to rebalance data, to move copies around, and to keep the replication of data high.

HDFS is not fully POSIX-compliant, because the requirements for a POSIX file-system differ from the target goals for a Hadoop application. The tradeoff of not having a fully POSIX-compliant file-system is increased performance for data throughput and support for non-POSIX operations such as Append.

The HDFS file system includes a so-called secondary namenode. The secondary namenode regularly connects with the primary namenode and builds snapshots of the primary namenode's directory information, which the system then saves to local or remote directories. These checkpointed images can be used to restart a failed primary namenode without having to replay the entire journal of file-system actions, then to edit the log to create an up-to-date directory structure. Because the namenode may be the single point for storage and management of metadata, it can become a bottleneck for supporting a huge number of files, especially a large number of small files. HDFS Federation, a new addition, aims to tackle this problem to a certain extent by allowing multiple name-spaces served by separate namenodes.

An advantage of using HDFS is data awareness between the job tracker and task tracker. The job tracker schedules map or reduce jobs to task trackers with an awareness of the data location. For example: if node A contains data (x,y,z) and node B contains data (a,b,c), the job tracker schedules node B to perform map or reduce tasks on (a,b,c) and node A would be scheduled to perform map or reduce tasks on (x,y,z). This reduces the amount of traffic that goes over the network and prevents unnecessary data transfer. When Hadoop is used with other file systems this advantage is not always available. This can have a significant impact on job-completion times, which has been demonstrated when running data-intensive jobs.

One potential drawback of HDFS, may be that HDFS was designed for mostly immutable files and may not be suitable for systems requiring concurrent write-operations. Another potential drawback of HDFS may be that it cannot be mounted directly by an existing operating system. Getting data into and out of the HDFS file system, an action that often needs to be performed before and after executing a job, can be inconvenient. A Filesystem in Userspace (FUSE) virtual file system has been developed to address this drawback, at least for Linux and some other Unix systems.

It will be appreciated that file access can be achieved through the native Java API, the Thrift API to generate a client in the language of the users' choosing (C++, Java, Python, PHP, Ruby, Erlang, Perl, Haskell, C #, Cocoa, Smalltalk, and OCaml), the command-line interface, or browsed through the HDFS-UI webappover HTTP.

Figure 2:
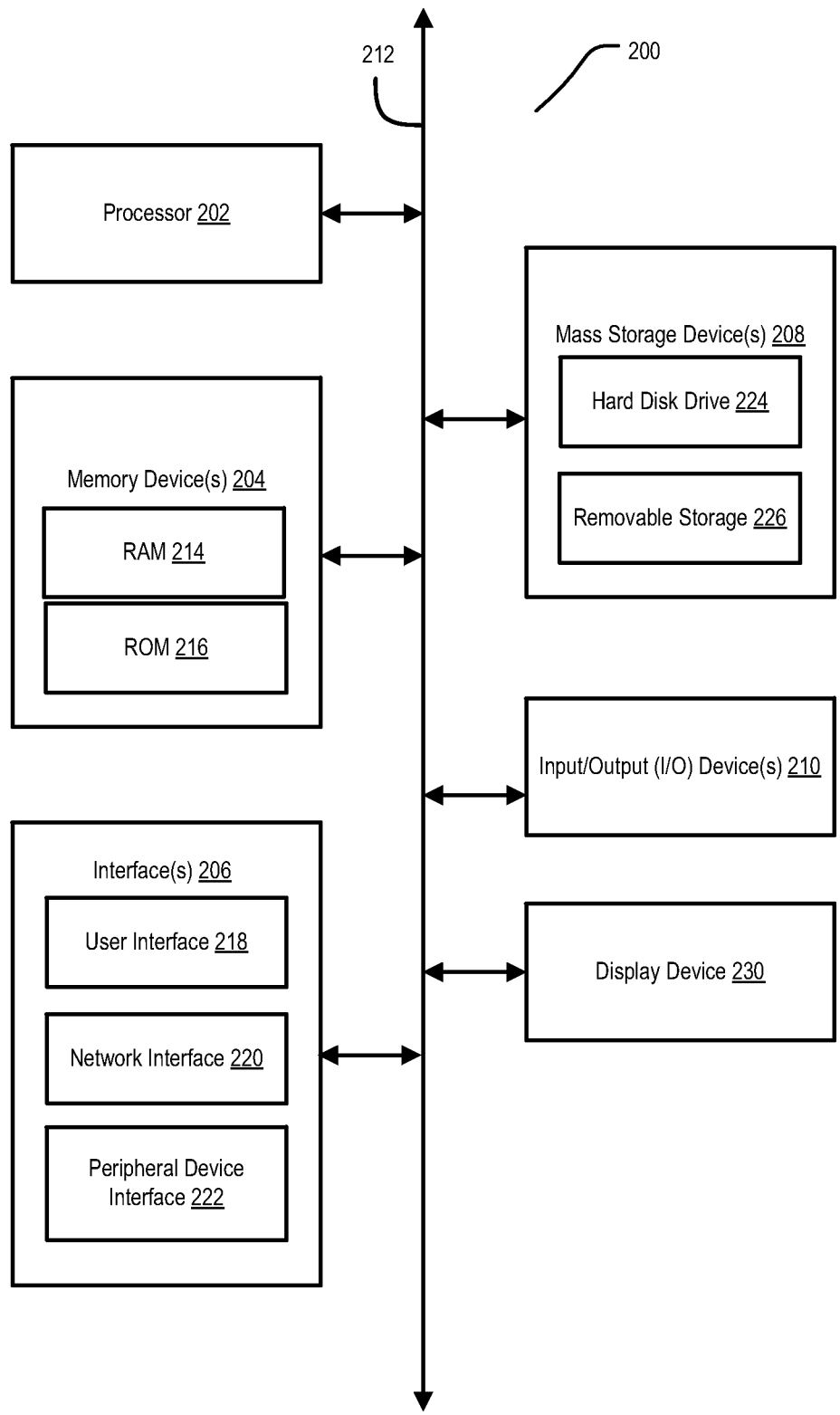
FIG. 2 illustrates an example block diagram of a computing device capable of performing the computer instructions and processes of the systems and methods disclosed.

Referring now to FIG. 2, a block diagram of an example computing device 200 is illustrated. Computing device 200 may be used to perform various procedures, such as those discussed herein. Computing device 200 can function as a server, a client, or any other computing entity. Computing device 200 can perform various monitoring functions as discussed herein, and can execute one or more application programs, such as the application programs described herein. Computing device 200 can be any of a wide variety of computing devices, such as a desktop computer, a notebook computer, a server computer, a handheld computer, tablet computer and the like.

Computing device 200 includes one or more processor(s) 202, one or more memory device(s) 204, one or more interface(s) 206, one or more mass storage device(s) 208, one or more Input/Output (I/O) device(s) 210, and a display device 230 all of which are coupled to a bus 212. Processor(s) 202 include one or more processors or controllers that execute instructions stored in memory device(s) 204 and/or mass storage device(s) 208. Processor(s) 202 may also include various types of computer-readable media, such as cache memory.

Memory device(s) 204 include various computer-readable media, such as volatile memory (e.g., random access memory (RAM) 214) and/or nonvolatile memory (e.g., read-only memory (ROM) 216). Memory device(s) 204 may also include rewritable ROM, such as Flash memory.

Mass storage device(s) 208 include various computer readable media, such as magnetic tapes, magnetic disks, optical disks, solid-state memory (e.g., Flash memory), and so forth. As shown in FIG. 2, a particular mass storage device is a hard disk drive 224. Various drives may also be included in mass storage device(s) 208 to enable reading from and/or writing to the various computer readable media. Mass storage device(s) 208 include removable media 226 and/or non-removable media.

I/O device(s) 210 include various devices that allow data and/or other information to be input to or retrieved from computing device 200. Example I/O device(s) 210 include cursor control devices, keyboards, keypads, microphones, monitors or other display devices, speakers, printers, network interface cards, modems, lenses, CCDs or other image capture devices, and the like.

Display device 230 includes any type of device capable of displaying information to one or more users of computing device 200. Examples of display device 230 include a monitor, display terminal, video projection device, and the like.

Interface(s) 206 include various interfaces that allow computing device 200 to interact with other systems, devices, or computing environments. Example interface(s) 206 may include any number of different network interfaces 220, such as interfaces to local area networks (LANs), wide area networks (WANs), wireless networks, and the Internet. Other interface(s) include user interface 218 and peripheral device interface 222. The interface(s) 206 may also include one or more user interface elements 218. The interface(s) 206 may also include one or more peripheral interfaces such as interfaces for printers, pointing devices (mice, track pad, or any suitable user interface now known to those of ordinary skill in the field, or later discovered), keyboards, and the like.

Bus 212 allows processor(s) 202, memory device(s) 204, interface(s) 206, mass storage device(s) 208, and I/O device(s) 210 to communicate with one another, as well as other devices or components coupled to bus 212. Bus 212 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 200, and are executed by processor(s) 202. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

Figure 3:
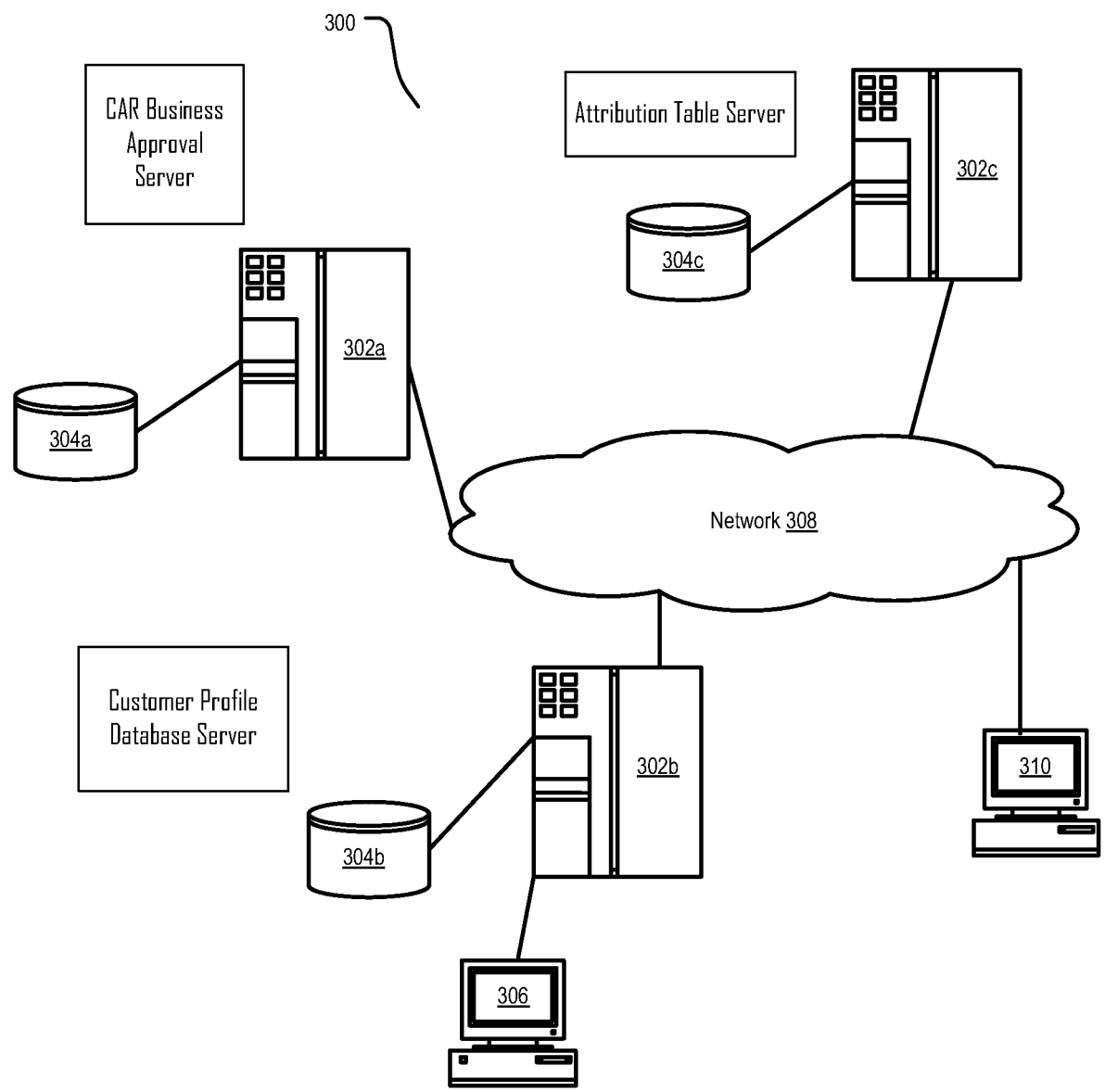
FIG. 3 illustrates an example computer and network architecture that facilitates different implementations of the disclosure.

Referring now to FIG. 3, an example of a computing environment 300 suitable for implementing the methods disclosed herein is illustrated. In some implementations, a server 302a provides business approval functionality and processes into the system an provides access to a corresponding database 304a in data communication therewith. The database 304a may store item information and may record information such as data representing business plans and proposals. The database 304a may additionally store plan and proposal information contained in a plurality of records for a business or organization. For example, the server 302a may implement a user interface and web server for entering and receiving business plan requests for data stored in the database 304a and formatting requested information into web pages that may be provided to customers and users during use.

A server 302b may be associated with a retail merchant or by another entity providing data aggregation services. The server 302b may be in data communication with a database 304b. The database 304b may store information regarding various aggraded customer, products and item attributes. In particular, information for attributes may data representing a name, description, categorization, reviews, comments, price, past transaction data, demographics, purchase history, social media connections, and the like. The server 302b may analyze this data as well as data retrieved from the database 304a and 304c in order to perform methods as described herein. An operator may access the server 302b by means of a workstation 306 that may be embodied as any general purpose computer, tablet computer, smart phone, or the like.

A server 302c provides on-going customer information to a database 304c in data communication therewith. The database 304c may store customer profiles and may record updated information such as retail behavior, purchase history, social behavior and network connections and the like. The database 304c may additionally store attribute information contained in a plurality of records from a plurality of sources connected over the internet. The server 302c may provide access to the database 304c to users and customers associated with a retailer, merchant or other user for approving business plans and proposals. The server 302c may provide and allow access to original source systems. For example, the server 302c may implement a web server for receiving requests for data stored in the database 304c and formatting requested information into web pages that may be provided to customers during online sessions and planning. The web server may additionally be operable to receive information and store the information in the database 304c.

The server 302a, server 302b and server 302c may communicate over a network 308 such as the Internet or some other local area network (LAN), wide area network (WAN), virtual private network (VPN), or other network. A user may access data and functionality provided by the servers 302a, 302b, 302c by means of a workstation 310 in data communication with the network 308. The workstation 310 may be embodied as a general purpose computer, tablet computer, smart phone or the like. For example, the workstation 310 may host a user interface for requesting aggregated data reports, displaying the reports, and receiving user interaction with various databases, and performing other functionality providing user access and manual influence of automatic processes. The workstation 310, workstation 306, servers 302a, 302b, 302c and databases 304a, 304b, 302c may have some or all of the attributes of the computing device 200.

Figure 4:
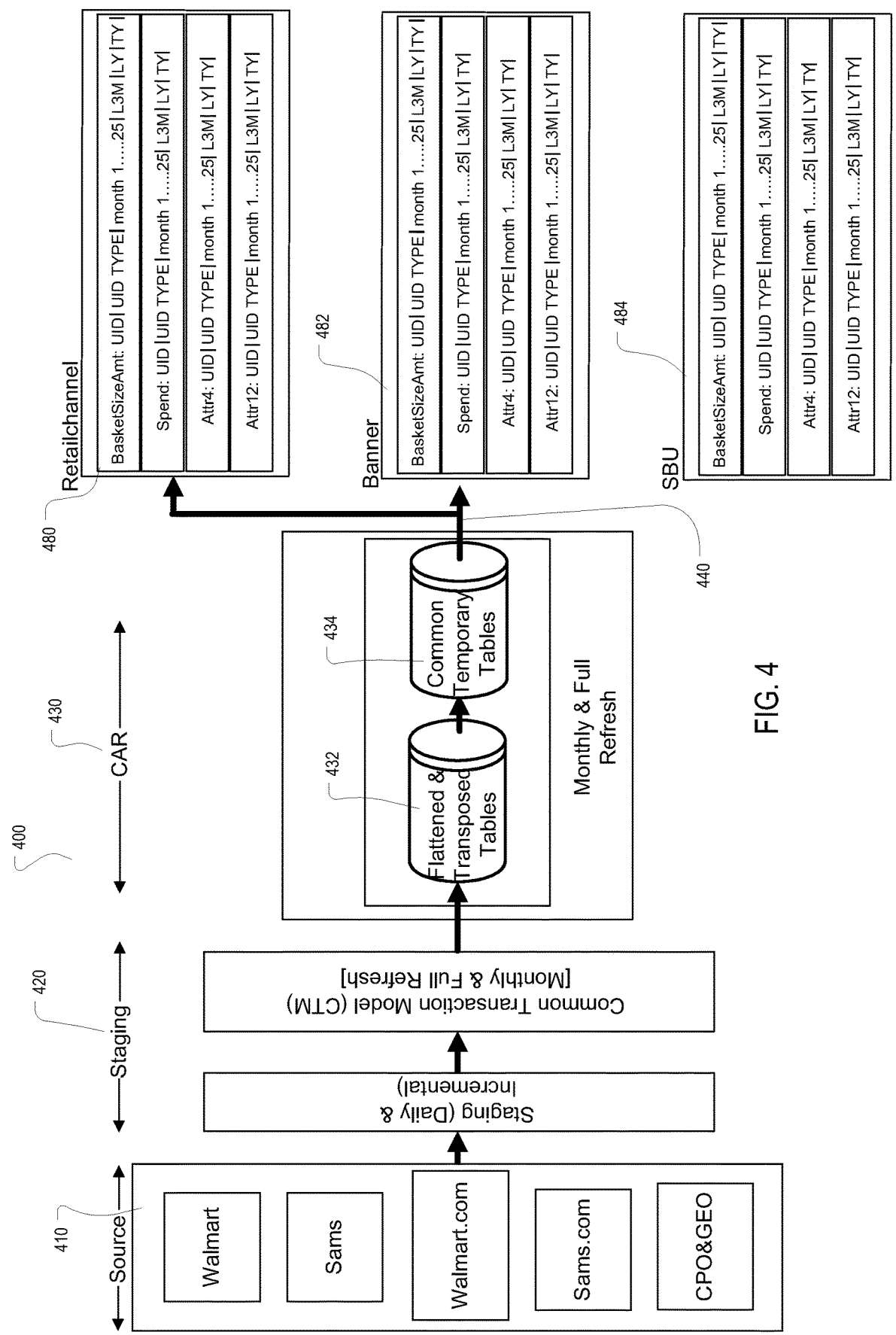
FIG. 4 illustrates an implementation of a workflow for generating attribute tables for holding attributes while a corresponding business plan is in an approval process in accordance with the teachings and principles of the disclosure.

With reference primarily to FIG. 4, an implementation of a workflow 400 will be discussed. At 410, information and data may be obtained automatically from various sources for use in creating one or more databases. As illustrated in FIG. 4, those sources may include retail brick and mortar stores, online merchant or other sites, as well as corporate or company knowledge and information. It will be appreciated that a database source may be a customer database comprising retail customer profiles and transaction histories corresponding to the retail customer profiles.

At 420 the information and data may be staged. Staging may be done incrementally, daily, or in some other manner without departing from the scope of the disclosure. Staging may utilize a common transaction model (CTM) and may include monthly and full refresh.

At 430, the workflow may use a computer assisted retrieval (CAR) engine. Database tables 432 and 434 may be automatically generated or created by the system. The system captures the input and automatically creates tables to store the data or information received from the sources once it is aggregated. Such database tables 432 and 434 may also hold or store captured, or new attribute information as created by the customer. Database table 432 may include flattened & transposed tables, whereas database table 434 may include common temporary tables.

At 440, aggregated totals may be output in a useable or meaningful form as database tables or otherwise. Such a meaningful form may be a table, report, or any other medium where aggregated data may be placed in a useable form for later use or processing. As new attributions are created for a customer, the workflow will use that information to build the necessary tables to aggregate totals without manual intervention. Such table generation may be in real-time or near real-time such that the aggregated totals are readily accessible and useable. Users are able to take the aggregated totals or calculations from the new attributions to make business decisions. At 480, 482, 484 the output may be used by various decision making entities to make business or other decisions.

Figure 5:
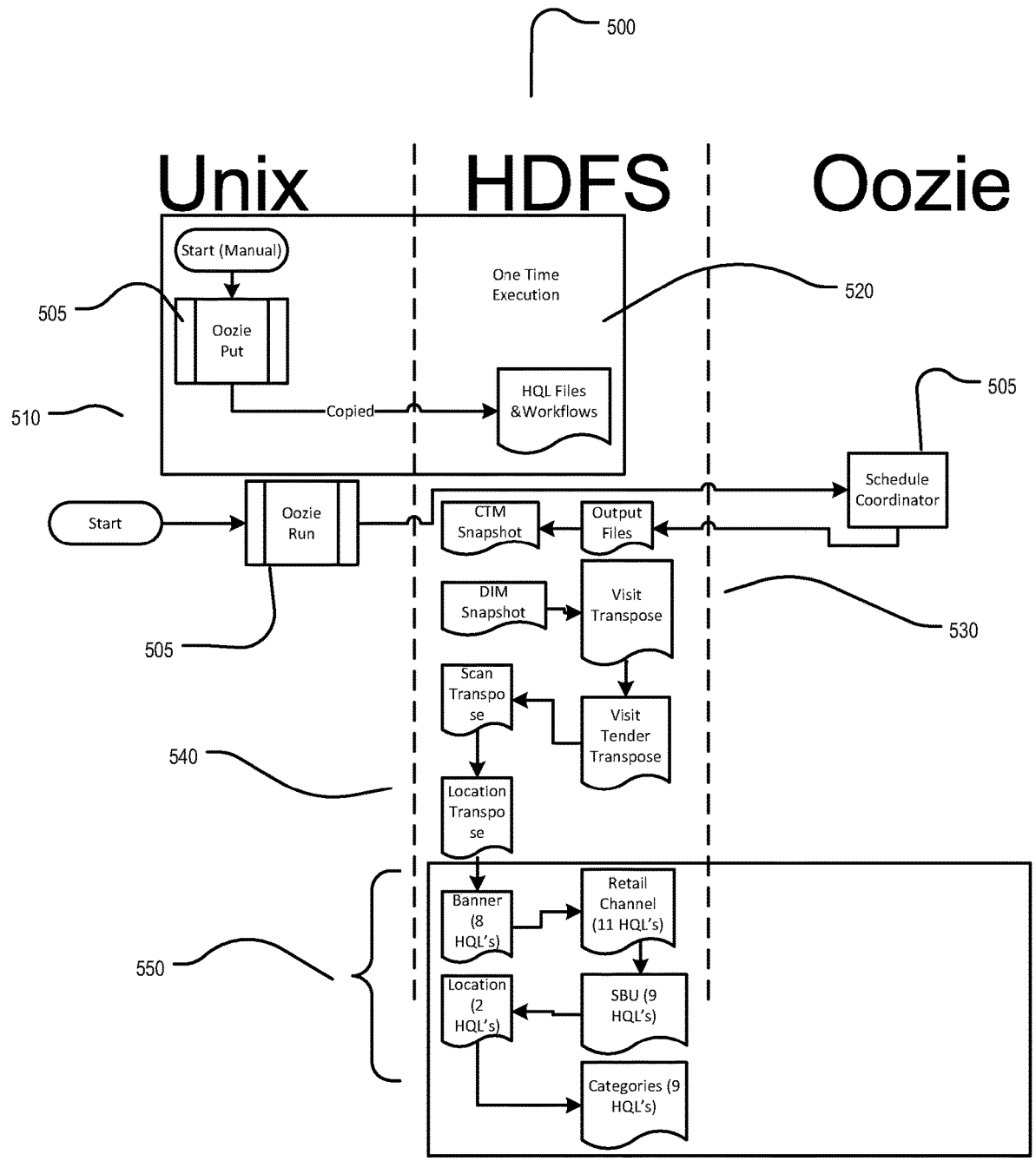
FIG. 5 illustrates an implementation of a system and method for generating attribute tables for holding attributes while a corresponding business plan is in an approval process with a workflow schedule coordinator in accordance with the teachings and principles of the disclosure.

With reference primarily to FIG. 5, an implementation of a system and method 500 of the disclosure will be discussed. An implementation of a system and method for generating attribute tables for holding attributes while a corresponding business plan is in an approval process over a computer network is illustrated. The system and method 500 may comprise checking the system status to determine if a previous workflow is being executed and initiating a new workflow using a scheduling coordinator 505.

FIG. 5 illustrates an implementation of a workflow schedule coordinator 505 in accordance with the teachings and principles of the disclosure. The system and method 500 may comprise receiving a request over a network for approval of a business plan and storing the request in computer memory at 510. The system and method 700 may further comprise capturing user inputs from the business plan or based on the business plan. The user inputs may describe features or attributes contained within or that are part of the business plan.

The system and method of FIG. 5 may further comprise generating attributes corresponding to the user inputs that will be used in the business plan at 520 and 530. At 540, a table may be generated for storing attribute data therein. The attribute data may correspond to the generated attributes for use by the business plan. At 540, a request may be generated for attribute data corresponding to fields within the table of attributes for requesting the attribute data from a database repository. The system and method may further comprise aggregating the requested attribute data from the database. The system and method may populate the fields within the table with the aggregated attribute data. At 550, output may be generated in the form of output tables or a report, wherein the output tables or report may convey aggregated attribute information corresponding to the user inputs and the business plan for which approval is sought.

Continuing to refer to FIG. 5, the system and method 500 may further comprise generating a hierarchy of attributes such that different attributes may be analyzed with different strengths within the table. The system and method 500 may further comprise providing a hierarchy of a plurality of database sources for use in attribute data conflict resolution. It will be appreciated that the criteria for the output tables may include the following. Each output table creates a file that initiates the next process. Each output table runs independently and will execute even with failures of other processes.

The schedule coordinator 505 of the system and method 500 may stop or interrupt a previous workflow. It will be appreciated that the interruption may occur before initiating a new workflow. In an implementation, an error code may be generated when a previous workflow is stopped or interrupted. The schedule coordinator 505 of the system and method 500 may generate an error code if more than one workflow is running.

The schedule coordinator 505 of the system and method 500 may initiate the running of the workflow. The schedule coordinator 505 of the system and method 500 may prioritize a plurality of workflows and determining a hierarchy of workflow priority. The schedule coordinator 505 of the system and method 500 may hold a workflow having a lower priority, thereby allowing a higher priority workflow to run. The schedule coordinator 505 of the system and method 500 may delay the initiation of a new workflow until a previously running workflow is finished. The schedule coordinator 505 of the system and method 500 may prevent a second workflow from running while a first workflow is running. The schedule coordinator 505 of the system and method 500 may amend a workflow schedule. At 550, a table or report may be generated conveying aggregated attribute information corresponding to the business plan for which approval is sought.

The schedule coordinator 505 of the system and method 500 may output a request to stop a previous workflow and not proceeding with starting a new workflow until receiving authorization to do so. The schedule coordinator 505 of the system and method 500 may stop the previously running workflow and retain a resultant partially finished table in memory in order to be retrieved from memory later once the previously running workflow is resumed. The schedule coordinator 505 of the system and method 500 may kill the previously running workflow and deleting a resultant partially finished table from memory.

The schedule coordinator 505 of the system and method 500 may schedule a plurality of workflows to run consecutively. The schedule coordinator 505 of the system and method 500 may determine a hierarchy of work flows within a schedule. The schedule coordinator 505 of the system and method 500 may prevent a second workflow from running until the new workflow has been completed.

Figure 6:
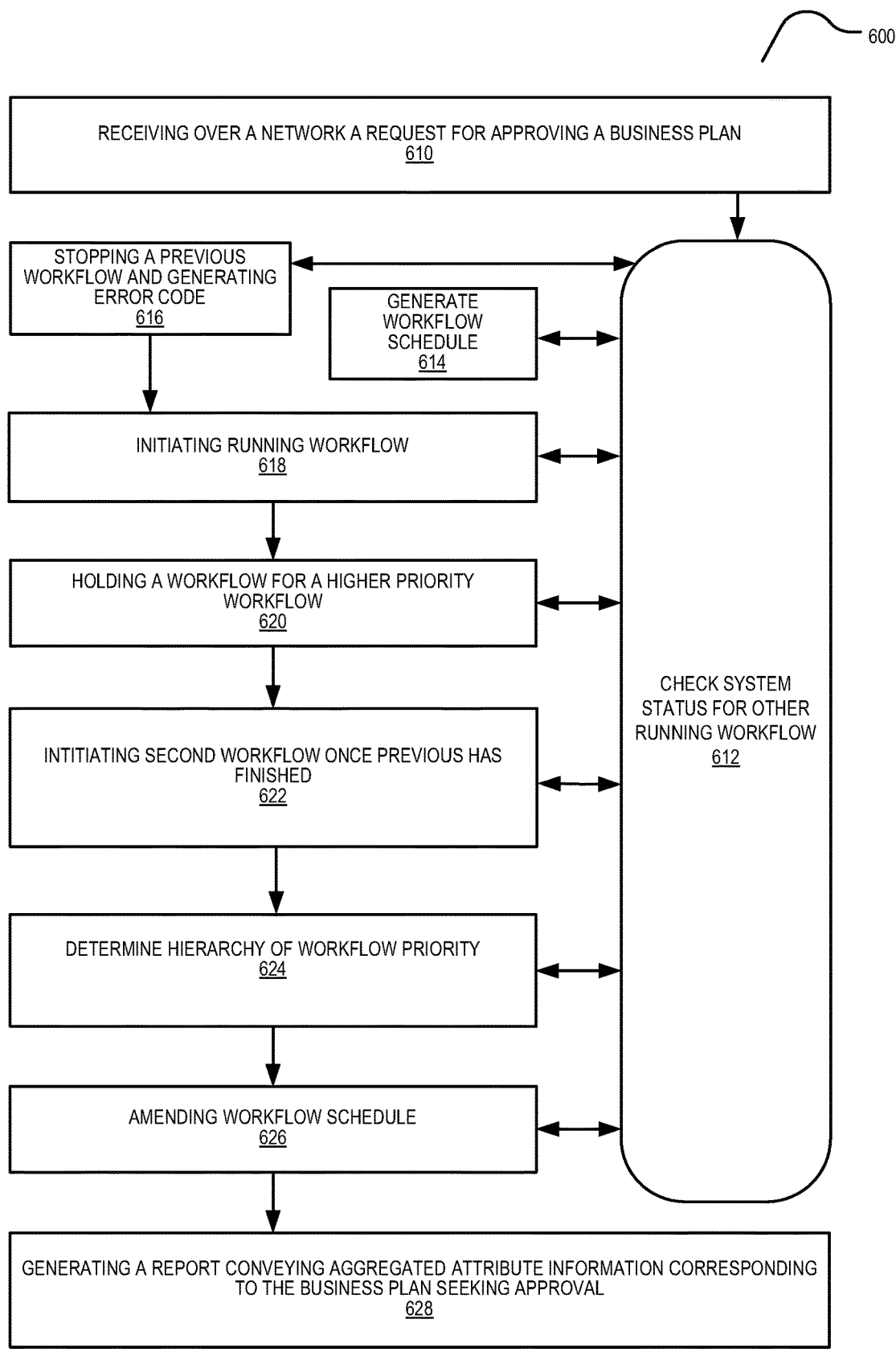
FIG. 6 illustrates a flow chart of an implementation of a system and method for generating attribute tables for holding attributes while a corresponding business plan is in an approval process in accordance with the teachings and principles of the disclosure.

With reference primarily to FIG. 6, an implementation of a system and method 600 for automatically generating workflow for establishing data tables for aggregating customer profiles data over a computer network will be discussed along with generating workflows and checking the status of the workflows over a computer network. The system and method 600 may comprise receiving a request over a network for approval of a business plan at 610. The system and method 100 may further comprise checking the system status to determine if a previous workflow is being executed at 612. At 614, a workflow schedule may be initiated or generated for controlling a plurality of work flow process emanating from a plurality of users. For example, the scheduler may stack the workflows in and order so that they are performed consecutively in the order in which they appear in the stack. It will be appreciated that the generated workflow schedule may comprise any combination of the features or all of the features disclosed in boxes 120-170 without departing from the scope of the disclosure, including capturing from the business plan user inputs that describe features of the business plan; generating attributes corresponding to the user inputs that will be used in the business plan and storing them in memory; generating a table for storing attribute data therein that corresponds to the generated attributes for use by the business plan; generating a request for attribute data corresponding to fields within the table of attributes for requesting the attribute data from a source database; aggregating the requested attribute data from the source database; populating the fields within the table with the aggregated attribute data; and generating a report conveying aggregated attribute information corresponding to the business plan seeking approval and the user inputs.

The system and method 600 may further comprise stopping or interrupting a previous workflow at 616. It will be appreciated that the interruption may occur before initiating a new workflow. In an implementation, an error code may be generated when a previous workflow is stopped or interrupted. In an implementation, the system and method 600 may further comprise generating an error code if more than one workflow is running.

In an implementation, the system and method 600 may comprise initiating the running of the workflow at 618. In an implementation, the system and method 600 may comprise prioritizing a plurality of workflows and determining a hierarchy of workflow priority at 624. In an implementation, the system and method 600 may further comprise holding a workflow having a lower priority, thereby allowing a higher priority workflow to run at 620. In an implementation, the system and method 600 may further comprise delaying the initiation of a new workflow until a previously running workflow is finished at 622. In an implementation, the system and method 600 may further comprise preventing a second workflow from running while a first workflow is running. In an implementation, the system and method 600 may further comprise amending a workflow schedule. At 628, a report may be generated conveying aggregated attribute information corresponding to the business plan for which approval is sought.

In an implementation, the system and method 600 may further comprise outputting a request to stop a previous workflow and not proceeding with starting a new workflow until receiving authorization to do so. In an implementation, the system and method 600 may further comprise stopping the previously running workflow and retaining a resultant partially finished table in memory in order to be retrieved from memory later once the previously running workflow is resumed. In an implementation, the system and method 600 may further comprise killing the previously running workflow and deleting a resultant partially finished table from memory.

In an implementation, the system and method 600 may further comprise scheduling a plurality of workflows to run consecutively. In an implementation, the system and method 600 may further comprise determining a hierarchy of work flows within a schedule. In an implementation, the system and method 600 may further comprise preventing a second workflow from running until the new workflow has been completed.

It is a potential feature or benefit of the disclosure to decrease the "Time to Market." The disclosure may allow business users to add additional attributes without going through a new development lifecycle involving costly involvement from a technical development team. It is another potential feature or benefit of the disclosure to allow flexibility to attribute metrics as needed based on the business "asks" or requests. It is another potential feature or benefit to provide a "true" analytical platform to answer business questions based around the customer. It is yet another potential feature or benefit to develop customized customer segmentations to items sold around seasonal and lifestyle merchandises. It is another potential feature or benefit to automate the process or workflow and provide the flexibility for the business users to develop attributes as needed, whereas current systems use attributes that are generated manually and developed through costly software development lifecycle.

The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

The invention claimed is:

1. A method for generating attribute tables for holding attributes over a computer network comprising:
providing a schedule coordinator on a computing device, the computing device including at least one processor and a memory operably coupled to the at least one processor, wherein the memory is configured to store instructions invoked by the at least one processor to implement the schedule coordinator;
receiving over a network a request for approving a business plan;
checking, with the schedule coordinator, a system status including at least one of the processor or the memory to automatically determine if a previous computing device program process executing a previous workflow is being executed by checking the system status;
initiating a new computing device program process configured to execute a new workflow after the schedule coordinator automatically determines the previous workflow is not being executed by checking the system status, interrupt the previous workflow, or delay the new workflow until the previous workflow has completed to ensure no overlap between the new workflow and the previous workflow to prevent a computing device process failure, the workflow comprising:
capturing from the business plan user inputs that describe features of the business plan;
generating attributes corresponding to the user inputs that will be used in the business plan and storing the attributes in memory;
generating a plurality of tables for storing attribute data therein that corresponds to the generated attributes for use by the business plan;
automatically generating a plurality of requests for attribute data corresponding to fields within the plurality of tables of attributes for requesting the attribute data from a source database;
aggregating the requested attribute data from the source database; and
populating the fields within the table with the aggregated attribute data; and
generating an output table conveying aggregated attribute information by an independent computing program process configured to execute after at least one other computing program process fails or generates an output table, wherein the output table creates a file that initiates a subsequent computing device program process.

2. The method of claim 1, further comprising outputting a request to stop a previous work flow and not proceeding with starting a new workflow until receiving authorization to do so.

3. The method of claim 1, further comprising stopping the previously running workflow and retaining a resultant partially finished table in memory in order to be retrieved from memory later once the previously running workflow is resumed.

4. The method of claim 1, further comprising killing the previously running workflow and deleting a resultant partially finished table from memory.

5. The method of claim 1, further comprising generating an error code if more than one workflow is running.

6. The method of claim 1, further comprising scheduling a plurality of workflows to run consecutively.

7. The method of claim 1, further comprising determining a hierarchy of work flows within a schedule.

8. The method of claim 1, further comprising preventing a second workflow from running until the new workflow has been completed.

9. A system for approving proposed business plans and automatically generating workflow for establishing data tables for aggregating customer profiles data therein, and wherein said approval process and business plan development data is exchanged over a computer network comprising one or more processors and one or more memory devices operably coupled to the one or more processors and storing executable and operational data, the executable and operational data effective to cause the one or more processors to:
receive a request for approving a business plan over a network;
check a system status including at least one of the one or more processors or the one or more memory devices with a schedule coordinator to automatically determine if a previous computer program process executing a workflow is being executed by checking the system status;
initiate a new computer program process configured to execute a new workflow after the scheduler coordinator automatically determines the previous computer program process is not being executed by checking the system status, interrupt the previous workflow or delay the new workflow until the previous workflow has completed to ensure no overlap between the new workflow and the previous workflow to prevent a computing device process failure, the workflow comprising:
capturing from the business plan user inputs that describe features of the business plan;
generating attributes corresponding to the user inputs that will be used in the business plan and storing the attributes in memory;
generating a plurality of tables for storing attribute data therein that corresponds to the generated attributes for use by the business plan;
automatically generating a plurality of requests for attribute data corresponding to fields within the plurality of tables of attributes for requesting the attribute data from a source database;
aggregating the requested attribute data from the source database; and
populating the fields within the table with the aggregated attribute data; and
generating an output table conveying aggregated attribute information by an independent computing program process configured to execute after at least one other computing program process fails or generates an output table, wherein the output table creates a file that initiates a subsequent computer program.

10. The system of claim 9, wherein the system further comprises outputting a request to stop a previous work flow and not proceeding with starting a new workflow until receiving authorization to do so.

11. The system of claim 9, wherein the system further comprises stopping the previously running workflow and retaining a resultant partially finished table in memory in order to be retrieved from memory later once the previously running workflow is resumed.

12. The system of claim 9, wherein the system further comprises killing the previously running workflow and deleting a resultant partially finished table from memory.

13. The system of claim 9, wherein the system further comprises generating an error code if more than one workflow is running.

14. The system of claim 9, wherein the system further comprises scheduling a plurality of workflows to run consecutively.

15. The system of claim 9, wherein the system further comprises determining a hierarchy of work flows within a schedule.

16. The system of claim 9, wherein the system further comprises preventing a second workflow from running until the new workflow has been completed.

* * * * *